(12) United States Patent
Pan et al.

(10) Patent No.: US 11,993,850 B2
(45) Date of Patent: May 28, 2024

(54) THREE-DIMENSIONAL LASER-ASSISTED PRINTING OF STRUCTURES FROM NANOPARTICLES

(71) Applicant: The Curators of the University of Missouri, Columbia, MO (US)

(72) Inventors: Heng Pan, Rolla, MO (US); Chinmoy Podder, Rolla, MO (US); Wan Shou, Allston, MA (US); Xiaowei Yu, Rolla, MO (US)

(73) Assignee: The Curators of the University of Missouri, Columbia, MO (US)

( * ) Notice: Subject to any disclaimer, the term of this patent is extended or adjusted under 35 U.S.C. 154(b) by 675 days.

(21) Appl. No.: 17/170,405

(22) Filed: Feb. 8, 2021

(65) Prior Publication Data

US 2021/0162504 A1     Jun. 3, 2021

Related U.S. Application Data

(63) Continuation-in-part of application No. PCT/US2019/045689, filed on Aug. 8, 2019.

(60) Provisional application No. 62/716,105, filed on Aug. 8, 2018.

(51) Int. Cl.
   *C23C 18/12*        (2006.01)
   *B22F 1/0545*     (2022.01)
   *B22F 10/25*      (2021.01)
   *B28B 1/00*       (2006.01)
   *B33Y 10/00*      (2015.01)
   *B33Y 70/10*      (2020.01)

(52) U.S. Cl.
   CPC .......... *C23C 18/127* (2013.01); *B22F 1/0545* (2022.01); *B22F 10/25* (2021.01); *B28B 1/001* (2013.01); *B33Y 10/00* (2014.12); *B33Y 70/10* (2020.01); *B22F 2304/054* (2013.01)

(58) Field of Classification Search
   CPC ....... C23C 18/08; C23C 18/143; C23C 18/02; C23C 18/14; B22F 10/25; B22F 2304/054; B28B 1/001; B33Y 10/00; B33Y 70/10
See application file for complete search history.

(56) References Cited

U.S. PATENT DOCUMENTS

| | | |
|---|---|---|
| 5,534,312 A | 7/1996 | Hill et al. |
| 2004/0079195 A1 | 4/2004 | Perry et al. |
| 2006/0211187 A1 | 9/2006 | Choi et al. |
| 2012/0225021 A1* | 9/2012 | Qian ..................... A61K 47/10 |
| | | 977/773 |

(Continued)

OTHER PUBLICATIONS

Stefanos Mourdikoudis, et.al "Oleylamine in Nanoparticle Synthesis", Chem. Mater. 2013, 25, 1465-1476. (Year: 2013).*

(Continued)

*Primary Examiner* — Brian D Walck
*Assistant Examiner* — Nazmun Nahar Shams
(74) *Attorney, Agent, or Firm* — Stinson LLP

(57) ABSTRACT

A method for manufacturing a component comprising bombarding nanoparticles in a dispersion with a laser to transform the ligand and cause the nanoparticles to drop out of the dispersion and deposit onto a substrate; and bombarding additional nanoparticles in the dispersion with the laser to transform the ligand and cause the nanoparticles to drop out of the dispersion and deposit onto the nanoparticles previously deposited out of the dispersion.

23 Claims, 4 Drawing Sheets

(56) References Cited

U.S. PATENT DOCUMENTS

| | | |
|---|---|---|
| 2014/0171523 A1 | 6/2014 | Lau et al. |
| 2018/0033707 A1 | 2/2018 | Marin et al. |
| 2018/0162726 A1 | 6/2018 | Donnio et al. |

OTHER PUBLICATIONS

International Search Report and Written Opinion for PCT Application No. PCT/US2019/045689, Oct. 2, 2019, 8 pages.

* cited by examiner

THREE-DIMENSIONAL LASER-ASSISTED PRINTING OF STRUCTURES FROM NANOPARTICLES

REFERENCE TO RELATED APPLICATIONS

This application is a continuation-in-part of International PCT Application Serial No. PCT/US2019/045689, filed Aug. 8, 2019, which claims the benefit of U.S. Provisional Application Ser. No. 62/716,105, filed Aug. 8, 2018, each of which are incorporated by reference herein in their entirety.

STATEMENT REGARDING FEDERALLY SPONSORED RESEARCH OR DEVELOPMENT

This invention was made with government support under NSF 1635256. The government has certain rights in the invention.

FIELD OF THE INVENTION

This invention relates to an additive process for manufacturing components and especially microscopic components.

BACKGROUND

Manufacturing processes using nanoparticles are of great interest because the resulting components can be made to be especially small, and especially functional in view of the high surface area of nanoparticles. High surface area small components are of interest in innumerable and diverse technical fields, such as for medical implants, electronics, micro battery electrodes, etc.

Additive manufacturing has revolutionized the production of complex parts for aerospace, automotive, electronics and medical applications. Today, most of commercially available metal additive manufacturing processes are at macroscale, and no established method is available for printing 3D features at micro/nanoscales. Three-dimensional printing of micro/nano structures is advantageous for diverse applications including electronics, optics, and medical devices. A wide range of materials including ceramics, polymers, and metals are useful for this purpose. Metal microfabrication is of high current interest in printable electronics, microelectromechanical systems, nanophotonics, and biomedical devices. Metal nanoparticles are used extensively for different metal printing techniques. These nanoparticles are usually encapsulated by ligands to stabilize them against agglomeration and also to help preserve their high surface area to volume ratio.

SUMMARY

Aspects of the invention are directed to various methods for manufacturing a component. In some embodiments, the method comprises bombarding nanoparticles in a dispersion (e.g., suspension) with a laser to transform the ligand and cause the nanoparticles to drop out of the dispersion and deposit onto a substrate; and bombarding additional nanoparticles in the dispersion with the laser to transform the ligand and cause the nanoparticles to drop out of the dispersion and deposit onto the nanoparticles previously deposited out of the dispersion.

In various embodiments, the method is for manufacturing a metal-containing component comprising: bombarding nanoparticles comprising metal nanoparticles and a ligand complexed therewith in a dispersion with a laser to transform the ligand and cause the metal nanoparticles to drop out of the dispersion and deposit onto a substrate; and bombarding additional nanoparticles in the dispersion with the laser to transform the ligand and cause the metal nanoparticles to drop out of the dispersion and deposit onto the metal nanoparticles previously deposited out of the dispersion.

In another aspect, the invention is directed to a system for carrying out the method, the system comprising a vessel (for holding the dispersion) and a laser source.

Other objects and features will be in part apparent and in part pointed out hereinafter.

DETAILED DESCRIPTION

Figure 1:
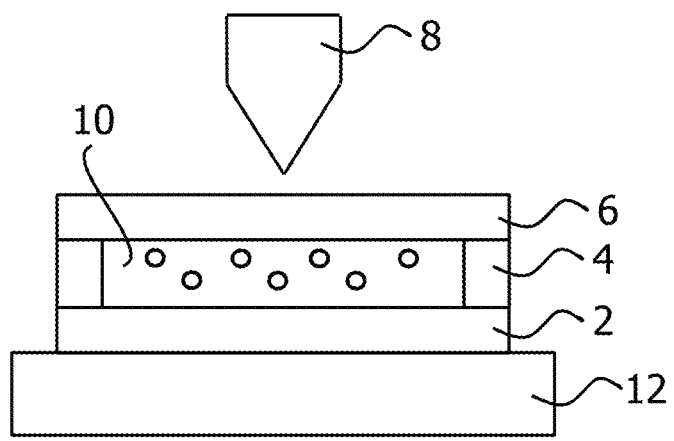
FIG. 1 is a schematic illustration of a system and apparatus for carrying out the method of the invention.

Aspects of the present invention are directed to various methods for manufacturing a component. In some embodiments, the method comprises bombarding nanoparticles in a dispersion (e.g., suspension) with a laser to transform the ligand and cause the nanoparticles to drop out of the dispersion and deposit onto a substrate; and bombarding additional nanoparticles in the dispersion with the laser to transform the ligand and cause the nanoparticles to drop out of the dispersion and deposit onto the nanoparticles previously deposited out of the dispersion. This method is effective for printing materials including metals, semiconductors and dielectrics. For example, the nanoparticles can comprise metal nanoparticles (e.g., neutral metal nanoparticles), metal oxide nanoparticles, or silicon nanoparticles.

In various embodiments, the method is for manufacturing a metal-containing component comprising: bombarding nanoparticles comprising metal nanoparticles and a ligand complexed therewith in a dispersion with a laser to transform the ligand and cause the metal nanoparticles to drop out of the dispersion and deposit onto a substrate; and bombarding additional nanoparticles in the dispersion with the laser to transform the ligand and cause the metal nanoparticles to drop out of the dispersion and deposit onto the metal nanoparticles previously deposited out of the dispersion.

The methods described herein involve the use of a focused laser on a dispersion (e.g., suspension) of nanoparticles (e.g., comprising metal nanoparticles such as Au, Ag, alloy, or other particles) in a printing-type technique to manufacture ultrafine three-dimensional structures using fusion phenomena of encapsulated nanoparticles impacted by femtosecond laser irradiation. The particles are held in a dispersion (e.g., suspension) by specially selected ligands. The focused laser transforms the ligands on the particles, which causes them to drop out of the dispersion (e.g., suspension) and deposit. In a typical process, the first series of particles deposit onto a substrate, and subsequent series of particles deposit onto previously deposited particles. The technique can produce patterns and components with submicron features and high aspect ratios.

Preferably, the particles are nanoparticles having a particle size of less than about 20 nm, such as less than about 10 nm, less than about 5 nm, from about 0.5 nm to 10 nm, or from about 1 nm to 5 nm. "Particle size" in the context of this invention refers to an average largest cross-sectional dimension of the particles as determined by transmission electron microscopy [TEM]. For a typical collection of spherical nanoparticles, therefore, particle size refers to the average diameter.

In various embodiments, the dispersion comprises has a concentration of the nanoparticles that is from about 0.01 wt % to 20 wt %, from about 0.1 wt % to 10 wt %, from about 0.2 wt % to 5 wt %.

As noted, in various embodiments, the nanoparticles comprise metal nanoparticles and a ligand complexed therewith. For example, the metal nanoparticles can comprise:

(a) at least one metal selected the metals of groups 3, 4, 5, 6, 7, 8, 9, 10, 11, 12, 13, 14, 15, 16, and combinations thereof;

(b) a transition metal or a combination of transition metals;

(c) a noble metal or a combination of noble metals;

(d) Fe, Co, Ni, Cu, Pd, Ag, Sn, Pt, Au, or a combination thereof; or (f) bimetallic CoPt, FePt, or $Co_{50}Ni_{50}$.

Various combinations of metals can include alloys of the metals mentioned herein. In some embodiments, the metal nanoparticles comprise Au and/or Ag.

In some embodiments, the nanoparticles comprise, consist essentially of (e.g., greater than 95 wt % or even 99 wt % of all metal present in the dispersion), or consist of M(0)-ligand complexes, where M(0) is one or more metals more reduced metals. Within the nanoparticle, the metal(s) can be neutral or slightly charged (e.g., approximately neutral). In various embodiments, M(0) comprises:

(a) at least one metal selected the metals of groups 3, 4, 5, 6, 7, 8, 9, 10, 11, 12, 13, 14, 15, 16, and combinations thereof;

(b) a transition metal or a combination of transition metals;

(c) a noble metal or a combination of noble metals;

(d) Fe, Co, Ni, Cu, Pd, Ag, Sn, Pt, Au, or a combination thereof; or (f) bimetallic CoPt, FePt, or $Co_{50}Ni_{50}$.

In some embodiments, the metal nanoparticles comprise Au and/or Ag.

Further, the dispersion can be free or essentially free (e.g., less than 1 wt % or even less than 0.1 wt %) of metal salts.

Preferably, the deposition of the metal nanoparticle occurs without the requirement for, or in the absence of, a dye (photochemical reducing agent), other component that is a reducing agent for metal ions, or a dye terminated ligand. The dispersion can be free or essentially free (e.g., less than 1 wt % or even less than 0.1 wt %) of a dye (photochemical reducing agent) or other component that is a reducing agent for metal ions. Even more preferably, metal ions are not reduced in the dispersion.

In some embodiments, the method further comprises feeding the dispersion to a reaction vessel, wherein the metal nanoparticles are the only type of metal-containing component present in the dispersion fed to the reaction vessel.

The method of claim 1 wherein the dispersion comprises has a concentration of the nanoparticles that is from about 0.01 wt % to 20 wt %, from about 0.1 wt % to 10 wt %, from about 0.2 wt % to 5 wt %.

The method of claim 1, further comprising feeding the dispersion to a reaction vessel, wherein the metal nanoparticles are the only type of metal-containing component present in the dispersion fed to the reaction vessel.

The nanoparticles can be prepared as a step in performing the invention, or may be obtained from commercial sources. The below working example describes one method for making the nanoparticles. According to this method, solid material containing metal is dispersed in an organic solution containing a solvent such as toluene and a ligand such as oleylamine. Dispersion of the nanoparticles may be assisted by sonication. A reagent such as $NaBH_4$ can then be added to the dispersion in order to reduce metal ions. The synthesized nanoparticles are then purified. This can be accomplished by removing the toluene using a rotary evaporator. Then ethanol is added to precipitate the nanoparticles. The precipitated particles are separated from the dispersion by centrifugation, and then washed with ethanol to remove any uncapped ligand and other byproducts. The nanoparticles can then be dried such as by vacuum drying and then dispersing the nanoparticles in a solvent to prepare the ink to be used in the deposition process. The ink typically contains between 0.01 and 20 wt % capped nanoparticles in solvent, such as between about 0.2 wt % and about 1 wt %. The solvent is preferably non-absorbing in laser wavelength, such as toluene.

The ligand composition is selected so that the ligands hold the particles in the dispersion (e.g., suspension), i.e., well dispersed, and prevent them from agglomerating and depositing. The ligand composition is also selected so that its optical properties contribute to or at least are compatible with the laser transformation process. Currently preferred examples of ligand compositions include, for example, thiols, amines, phosphines, and phosphine oxides. In various embodiments, the ligand comprises an alkylamine (e.g., $C_{10}$-$C_{30}$ alkylamine) or an alkenyl amine (e.g., $C_{10}$-$C_{30}$ alkenylamine). An alkenylamine has at least one carbon-carbon double bond. One class of preferred ligands comprises saturated or unsaturated fatty acid amines, particularly oleylamine. Other suitable ligands include dodecanethiol, carboxylic acids, hexadecylamine, and octadecylamine, for example.

The ratio of ligand composition is typically such that the metal particles are held in the dispersion (e.g., suspension) and prevented from unintentionally agglomerating and depositing; and so the ligands can be transformed when deposition is desired. The particular ratio selected depends on particle size, and is selected to be sufficiently high to prevent agglomeration. In one preferred embodiment, the ratio of ligand molecules to nanoparticles is selected to be between about 10:1 and about 700:1 molecules per nanoparticle, such as between about 100:1 and about 400:1.

Generally, the dispersion comprises a liquid carrier. In various embodiments, the liquid carrier comprises an organic solvent. In some embodiments, the dispersion comprises a liquid carrier comprising a nonpolar organic solvent. Examples of nonpolar organic solvents include toluene and/or xylene(s). The dispersion can have a liquid carrier concentration of from about 80 wt % to 99.99 wt %, from about 90 to about 99.9 wt %, or from about 95 wt % to about 99.8 wt %. In certain embodiments, the dispersion consists or consists essentially (e.g., less than 1 wt % or even less than 0.1 wt % of other ingredients) of the nanoparticles and the liquid carrier.

Initial deposition is typically performed onto a substrate provided, and the deposit then grows as additional nanoparticles are deposited onto previously deposited particles.

Accordingly, the method can further comprise continuing to bombard additional nanoparticles in the dispersion with the laser to transform the ligand and cause the nanoparticles (e.g., metal nanoparticles) to drop out of the dispersion and deposit onto the nanoparticles previously deposited out of the dispersion to grow a three-dimensional structure.

Substrates include various materials such as glass, ceramics, silicon, conductive, metal, and polymer substrates. In a preferred embodiment, the substrate comprises glass.

The substrate (e.g., glass) can be cleaned with solvents such as acetone, ethanol, isopropanol, and deionized water. The substrate can then be prepared for initial deposition by coating with the nanoparticles. For example, the initial deposition can include spincoating and/or thermal annealing nanoparticles onto the substrate prior to said bombarding nanoparticles with the laser.

In a preferred approach, a small quantity of the nanoparticle dispersion is placed in the center of a glass slide and is spincoated to distribute the nanoparticles across the substrate. For example, two or three drops of 25 wt % oleylamine-capped gold nanoparticle ink containing nanoparticles is spincoated at 2000 rpm for 45 seconds to distribute the nanoparticle ink across the substrate. The concentrated ink initially applied to the substrate such as by spincoating typically contains between about 1 and 30 wt % capped nanoparticles in solvent, such as between about 10 wt % and about 25 wt %. The coated substrate is then optionally annealed such as at a temperature between 90 and 300° C. for between 1 and 120 minutes, such as 200° C. for 60 minutes, in order to adhere the spincoated nanoparticles to the substrate.

In carrying out the method, the dispersion (e.g., suspension) of ligand-capped nanoparticles and solvent is held in a vessel. There is laser access to the vessel, such as through a glass lid on the vessel. The deposition vessel is preferably connected to a reservoir for replenishing the dispersion (e.g., suspension) with nanoparticles.

In one preferred embodiment, the vessel is sealed chamber comprising vertical walls that are attached directly to the substrate. FIG. 1 illustrates this schematically with the substrate 2 to which are attached vertical walls 4 and glass lid 6. The nanoparticle dispersion 10 is held within the vessel formed by the substrate 2, walls 4, and lid 6. This is shown schematically, as of course there are also front and back walls. The walls are sealed to each other and to the substrate by chemical resistant adhesives. Substrate 2 is mounted on a piezoelectric stage 12. The laser source 8 directs a laser through the glass lid and into the nanoparticle dispersion (e.g., suspension).

The dispersion (e.g., suspension) is bombarded with a laser, with the focal point of the laser positioned where the particle deposition is desired. The focused laser transforms the ligands, causing the nanoparticles to deposit either on a substrate provided initially or on previously deposited metal. Without being bound to a particular theory, the laser excitation causes the ligand chain to be transformed, desorbed, and/or condensed into an amorphous carbon layer around the nanoparticles. It appears that when the femtosecond laser pulses strike the ligand-capped nanocrystals, the electron temperature increases significantly in the nanocrystals. The electron heating induces femtochemistry at the surface and reaction/transformation of ligands. The transformation is an electronic excitation process relying on influences which are one or more of electrical, mechanical, optical, and chemical. Significantly, the transformation mechanism is non-thermal, so vaporization of solvent is avoided or minimized. Once the ligands are transformed by being desorbed and/or carbonized, the steric repulsion is largely reduced among nanocrystals, which causes fusion and coalescence. This process of nanocrystal fusion is driven largely electronically, which is very different from the thermal sintering process. The original steric repulsion of the nanoparticles is thereby reduced, and adhesion to adjacent nanoparticles within the laser-affected space is enhanced, resulting in self-fusion and coalescence. As a general proposition, ligand transformations can be driven by thermal heating or by hot-carrier-driven chemical reactions. Under the latter, laser excitation of electrons is followed by phonon relaxation and heat dissipation into solvent. Based on two-temperature model (TTM) studies, hot-carrier driven chemical reactions are believed to be the mechanism in this invention.

The preferred laser is a femtosecond laser, which is a laser which emits pulses with a pulse duration of less than 1000 femtoseconds, where a femtosecond is $10^{-15}$ seconds. It is therefore an ultrafast and ultrashort laser. Typical parameters for a laser used in this invention are a power input with intensity of $10^{10}$ to $10^{13}$ W/cm$^2$. In various embodiments, the laser has a pulse repetition rate from about 100 kHz to about 50 MHz or from about 120 kHz to about 27 MHz. Also, the laser can have pulse energy up to 20 uJ. The laser can be a femtosecond fiber laser. In certain embodiments, the laser is not a Ti:sapphire laser.

In a variation of the process, the ultimate structure is made from multiple different materials by manipulating the particle dispersion (e.g., suspension) during the process. For example, one part of a structure may be manufactured from a more noble metal and another part of the same structure may be manufactured by a different, less noble metal. Moreover, this printing technique is effective for other materials, including other metals, metal oxides, (e.g., NiO, CoO, FeO, $Fe_3O_4$, MnO, $Mn_3O_4$, ZnO, $TiO_2$, or silicates), semiconductor nanoparticles (e.g., CdS, CdTe, Ge, or Si) dielectrics (e.g., $SiO_2$), and any combinations thereof.

Example 1

An organic suspension was prepared by dissolving 100 mg of solid $HAuCl_4$ in 50 ml toluene containing 2 ml of oleylamine (70%, technical grade) in a round bottom flask. The mixture was sonicated for 2-3 minutes until all the $HAuCl_4$ was totally dissolved. Ten (10) ml of 10 mg/ml freshly prepared $NaBH_4$ solution was quickly added to the organic solution with vigorous stirring. The addition of $NaBH_4$ resulted in an immediate color change from colorless to dark red. Stirring was continued for another 5 minutes. Gold nanoparticles containing an organic layer were formed and were separated from the aqueous layer in the reaction mixture and then filtered to remove any undissolved impurities. The nanoparticles were then purified: First, the toluene solvent was removed by using rotary evaporator. Ethanol (100 ml) was then added to the remaining solution to precipitate the nanoparticles. The precipitate was separated by centrifugation (4000 rpm for 15 mins) and washed with ethanol two more times to wash off the remaining uncapped oleylamine and other byproducts. Vacuum drying was performed on the wet nanoparticles for 5-10 minutes. The nanoparticles were then dispersed in toluene to prepare the ink with the desired concentration.

A Laurell WS 650-23B spin coater was then used to prepare the initial substrate. A regular glass slide was cut into smaller pieces and cleaned with solvents acetone, ethanol, isopropanol, and deionized water. Highly concentrated (25 wt. %) commercial oleylamine capped gold nanoparticle ink (from UT Dots, Inc., Champaign, Illinois) was then used to spin-coat a layer about 200 nm thick onto the glass substrates by spinning at 2000 rpm for 45 seconds. The substrate was then annealed in an ambient atmosphere for 60 minutes at a temperature of 200° C. to enhance adhesion of the nanoparticles.

A sealed chamber was prepared to contain the diluted nanoparticle ink and to prevent it from drying out during printing. A commercial imaging spacer (SecureSeal 654004, Grace Bio Labs) having a 0.12 mm thickness was mounted on the spin-coated substrate using double-sided tape. Nanoparticle ink was supplied by placing two to three drops of the ink (0.2 wt % nanoparticles) in the center of the substrate and then filling the chamber with toluene. Then a coverslip (0.17 mm thick) was placed and pressed on top of the chamber walls to complete the sealed chamber.

A femtosecond pulsed laser (CalmarCazadero) with 1030 nm wavelength, 400 fs pulse width and adjustable repetition rates (120 KHz-27 MHz) was used in this process. Oleylamine-capped gold nanoparticle ink was used to spin-coat a layer of ink on a glass substrate. In some instances, the ink was commercially available oleylamine-capped gold nanoparticle ink having a high concentration of 0.2-25 wt % nanoparticles having a particle size of 3-4 nm in toluene. In other instances, the ink had a concentration of 0.2 wt % nanoparticles having a particle size of 3-4 nm in toluene and was prepared as described above by dissolving $HAuCl_4$ in toluene.

A high numerical aperture oil immersion objective (Olympus UPLFLN40XO with NA=1.3) was employed to match the refractive index of the solvent used for the ink. The laser power used was in the range of 0.2 mW to 5.0 mW. The laser was focused on the top of the substrate with 710 KHz repetition rate and 0.6 mW power. The laser peak intensity used was in the range of $1\times10^{10}$ W/cm$^2$ to $1\times10^{12}$ W/cm$^2$. When the laser pulses hit the ligand-capped nanoparticles in suspension, the ligands were transformed, enabling controlled coalescence and printing of the nanoparticles. A black solid dot was observed immediately. By allowing a laser dwell for a time range of 0.2 to 5 seconds, 3D micro-pillar structures of different heights (up to a few microns) were printed.

Figure 2:
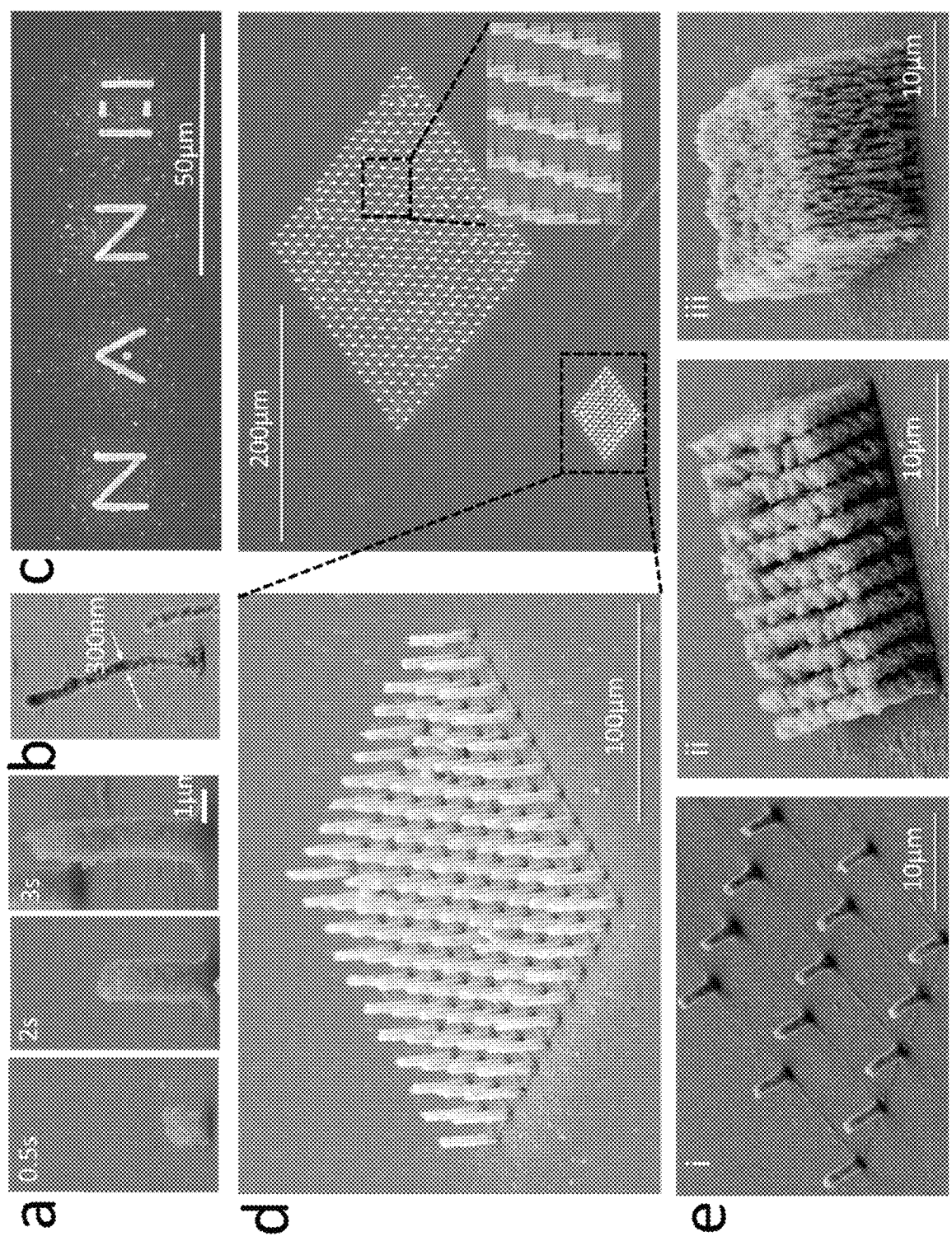
FIG. 2 is a series of scanning electron microscope (SEM) images of components manufactured according to the invention.

FIG. 2a shows SEM images of single free-standing pillars printed with 0.5, 2 and 3 s laser irradiation times. The smallest pillar diameter was ~300 nm, which was achieved by using 5.4 MHz repetition rate and peak intensity of about $1.11\times10^{10}$ W/cm$^2$. FIG. 2b is an SEM image of a single 3D pillar with 300 nm diameter. FIG. 2c is an electron micrograph of the word 'NANO' printed in this manner with a 710 KHz repetition rate laser peak intensity of $2.68\times10^{11}$ W/cm$^2$. FIG. 2d is an SEM image of large scale printed 3D pillar arrays printed with raster scan mode of the piezoelectric stage. The larger array in FIG. 2d consists of 400 pillars with each having about 5 μm height and about 1 μm diameter. FIG. 2e includes (i) a 3D pillar array showing 11.5 μm pillar-to-pillar gap, (ii) a 3D pillar array showing 1 μm pillar-to-pillar gap, and (iii) a 3D block. The highest resolution obtained by this process was about 400 nm linewidth with 5.4 MHz repetition rate and 1.6 mW laser power.

Dependencies of printed feature size on laser irradiation power and dwell time were studied to explore the minimum feature size that is printable by this process. For example, it was demonstrated that under otherwise similar conditions, a dwell times of 0.2 seconds yielded a three-dimensional pillar of 0.794 μm height while a dwell time of 5 seconds yielded a pillar of 6.045 μm height. Other experimental runs showed that sub-diffraction limited features can be fabricated with dodecanethiol-capped nanoparticles to produce smaller features than amine-capped nanoparticles. The smallest 2D feature produced is about 350 nm.

Raman characterization was performed to assist in understanding the microscopic aspects of the laser printing process. Raman spectra were generated for as-deposited nanoparticle layer, laser printed layer, laser printed+post-treatment layer, laser printed+centrifuge wash layer, and oleylamine only. The data indicated that the transformed ligand (amorphous carbon form) was largely removed from the printed structures. We conclude that the femtosecond laser pulses transformed the ligands into amorphous carbon. The printed structures just after processing contained this amorphous carbon wrapping the printed structures which can be removed by post-treatment.

Figure 3:
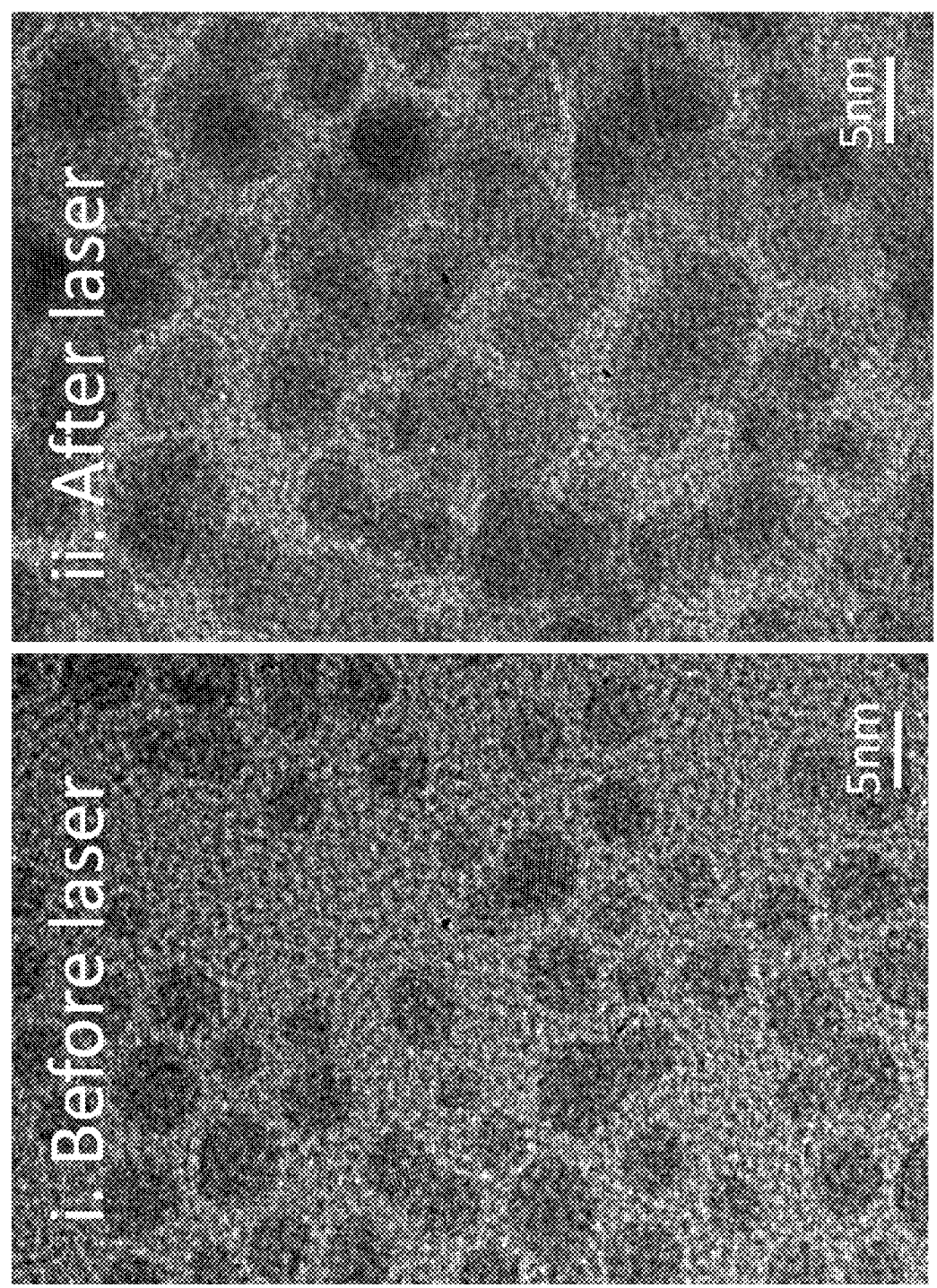
FIG. 3 is a transmission electron microscope (TEM) micrograph demonstrating an effect of a femtosecond laser on a nanoparticle ink under this invention.

A representative high-resolution TEM image of the OA capped nanocrystals before and after laser irradiation is presented in FIG. 3. Before laser irradiation, the nanocrystals are close-packed and isolated from each other due to the steric repulsion of the encapsulating ligands on the surface of the nanocrystals. After laser irradiation using 20× NA=0.4 objective, 710 kHz, 2.75 mW laser power, and 1 s dwell time, those particles coalescence enabling self-fusion. The grain size of these fused particle indicates that controlled coalescence is possible without any thermal sintering effect by the laser pulses.

Varying the repetition rate (number of laser pulses emitted per second) while keeping the average power constant demonstrates that the printed volume is in part dependent on repetition rate. It suggests that peak laser intensity plays a greater role than average laser power in inducing printing. It appears that when the femtosecond laser pulses strike the ligand-capped nanocrystals, the electron temperature increases significantly in the nanocrystals. The electron heating induces femtochemistry at the surface and reaction/transformation of ligands. Once the ligands are transformed by being desorbed and/or carbonized, the steric repulsion is largely reduced among nanocrystals, which causes fusion and coalescence. This process of nanocrystal fusion is driven largely electronically, which is very different from the thermal sintering process. This transformation produces an amorphous carbon layer surrounding the particles, which remains in the printed structures. Through thermal treatment steps, this carbon can be substantially eliminated.

Figure 4:
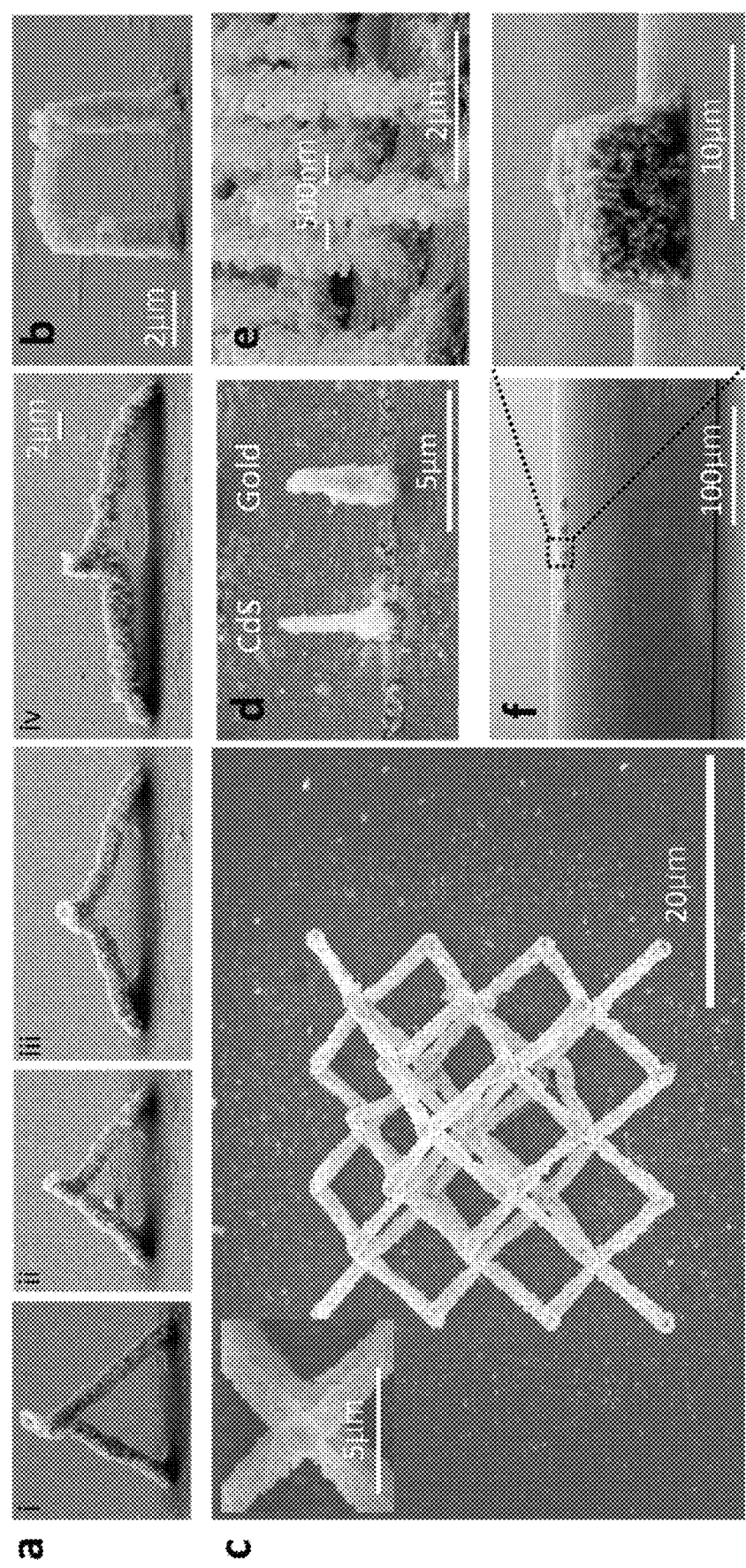
FIG. 4 is a series of scanning electron microscope (SEM) images of components manufactured according to the invention.

Various complicated structures ranging from hundreds of nanometers to several micrometers in dimension were fabricated. The laser was focused through the nanoparticle solution on the substrate and then the 3-axis piezoelectric stage was moved along desired direction with controlled speed to print tilted pillars with different angles as shown in FIG. 4a. Overhanging structures were also made by this technique without using any support materials as shown in FIG. 4b. Hierarchical structures were directly printed, thus indicating application of this technique for mechanical metamaterials as shown in FIG. 4c. Multi-material printing including gold and CdS pillars were printed next to each other in FIG. 4d. The array of free-standing nano-pillars with diameter of about 500 nm in FIG. 4e was manufactured to demonstrate a facile approach for manufacturing optical metamaterials without using multi-step lithography-based process. Multifunctional integration was demonstrated by direct printing metal periodic structures on an optical fiber as shown in FIG. 4f. The printed metal periodic structure can enhance or enable sensing capabilities for long period fiber gratings sensors.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A method for manufacturing a metal-containing component comprising:
    bombarding nanoparticles comprising metal nanoparticles and a ligand complexed therewith in a dispersion with a laser to transform the ligand and cause the metal nanoparticles to drop out of the dispersion and deposit onto a substrate; and
    bombarding additional nanoparticles in the dispersion with the laser to transform the ligand and cause the metal nanoparticles to drop out of the dispersion and deposit onto the metal nanoparticles previously deposited out of the dispersion.

2. The method of claim 1 wherein the laser is a femtosecond laser.

3. The method of claim 1 wherein the laser has a pulse repetition rate from about 120 kHz to about 27 MHz.

4. The method of claim 1 wherein the metal nanoparticles comprise:
    (a) at least one metal selected the metals of groups 3, 4, 5, 6, 7, 8, 9, 10, 11, 12, 13, 14, 15, 16, and combinations thereof;
    (b) a transition metal or a combination of transition metals;
    (c) a noble metal or a combination of noble metals;
    (d) Fe, Co, Ni, Cu, Pd, Ag, Sn, Pt, Au, or a combination thereof; or
    (f) bimetallic CoPt, FePt, or $Co_{50}Ni_{50}$.

5. The method of claim 1 wherein the nanoparticles comprise M(0)-ligand complexes, where M(0) is one or more metals at neutral charge or approximately neutral charge.

6. The method of claim 5 wherein M(0) comprises:
    (a) at least one metal selected the metals of groups 3, 4, 5, 6, 7, 8, 9, 10, 11, 12, 13, 14, 15, 16, and combinations thereof;
    (b) a transition metal or a combination of transition metals;
    (c) a noble metal or a combination of noble metals;
    (d) Fe, Co, Ni, Cu, Pd, Ag, Sn, Pt, Au, or a combination thereof; or
    (f) bimetallic CoPt, FePt, or $Co_{50}Ni_{50}$.

7. The method of claim 1 wherein the dispersion is essentially free of metal salts.

8. The method of claim 1 wherein the dispersion is essentially free of a dye or reducing agent for metal ions.

9. The method of claim 1 wherein deposition of the metal nanoparticle occurs in the absence of a dye, reducing agent for metal ions, or a dye terminated ligand.

10. The method of claim 1 wherein metal ions are not reduced in the dispersion.

11. The method of claim 1, further comprising feeding the dispersion to a reaction vessel, wherein the metal nanoparticles are the only type of metal-containing component present in the dispersion fed to the reaction vessel.

12. The method of claim 1 wherein the dispersion comprises a liquid carrier comprising an organic solvent.

13. The method of claim 1 wherein the dispersion has a concentration of the nanoparticles that is from about 0.01 wt % to 20 wt %, and/or
    the dispersion comprises a liquid carrier and has a liquid carrier concentration of from about 80 wt % to 99.99 wt %.

14. The method of claim 1 wherein the dispersion consists essentially of the nanoparticles and the liquid carrier.

15. The method of claim 1 wherein the ligand transformation is caused by laser-driven hot-carrier effect.

16. The method of claim 1 wherein the nanoparticles have a particle size of less than 10 nm.

17. The method of claim 1 wherein the ligand comprises at least one from the group selected from among thiols, amines, carboxylic acids, phosphines, and phosphine oxides.

18. The method of claim 1 wherein the ligand comprises a fatty acid amine.

19. The method of claim 1 wherein the ligand comprises oleylamine, octadecylamine, and hexadecylamine.

20. The method of claim 1 wherein the substrate comprises at least one selected from the group consisting of glass, ceramics, silicon, conductive, metal, and polymer substrates.

21. The method of claim 1, further comprising:
    spincoating nanoparticles onto the substrate prior to said bombarding nanoparticles with the laser, and/or
    continuing to bombard additional nanoparticles in the dispersion with the laser to transform the ligand and cause the metal nanoparticles to drop out of the dispersion and deposit onto the metal nanoparticles previously deposited out of the dispersion to grow a three-dimensional structure.

22. A method for manufacturing a component comprising:
    bombarding nanoparticles and a ligand complexed therewith in a dispersion with a laser to transform the ligand and cause the nanoparticles to drop out of the dispersion and deposit onto a substrate; and
    bombarding additional nanoparticles in the dispersion with the laser to transform the ligand and cause the nanoparticles to drop out of the dispersion and deposit onto the nanoparticles previously deposited out of the dispersion.

23. The method of claim 22 wherein the nanoparticles comprise at least one of:
    (a) semiconductor nanoparticles,
    (b) dielectric nanoparticles; and/or
    (c) metal oxide nanoparticles.

* * * * *